United States Patent
Kang (10) Patent No.: US 9,840,284 B2
(45) Date of Patent: Dec. 12, 2017

(54) COWL SIDE REINFORCEMENT STRUCTURE IN VEHICLE

(71) Applicant: Kia Motors Corporation, Seoul (KR)

(72) Inventor: Changu Kang, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 15/193,197

(22) Filed: Jun. 27, 2016

(65) Prior Publication Data

US 2017/0158246 A1    Jun. 8, 2017

(30) Foreign Application Priority Data

Dec. 3, 2015 (KR) .................. 10-2015-0171749

(51) Int. Cl.
*B62D 25/04* (2006.01)
*B62D 25/08* (2006.01)
*B62D 25/12* (2006.01)
*B62D 65/06* (2006.01)

(52) U.S. Cl.
CPC .......... *B62D 25/081* (2013.01); *B62D 25/04* (2013.01); *B62D 25/12* (2013.01); *B62D 65/06* (2013.01)

(58) Field of Classification Search
CPC ...... B62D 25/04; B62D 25/08; B62D 25/081; B62D 25/082; B62D 25/12; B62D 65/06
USPC .......................................... 296/192, 203.02
See application file for complete search history.

(56) References Cited

U.S. PATENT DOCUMENTS

| | | | | |
|---|---|---|---|---|
| 4,264,101 A * | 4/1981 | Gotoh | .................. | B62D 25/081 296/203.02 |
| 4,270,793 A * | 6/1981 | Harasaki | ................ | B62D 25/04 180/90 |
| 4,669,419 A * | 6/1987 | Kato | ...................... | A01K 61/70 119/221 |
| 4,883,309 A * | 11/1989 | Miyazaki | ............. | B62D 27/026 296/192 |
| 5,052,742 A * | 10/1991 | Akoshima | ............ | B62D 25/081 296/192 |
| 5,269,583 A * | 12/1993 | Maeda | ................. | B62D 25/082 296/187.09 |
| 6,209,950 B1 * | 4/2001 | Hanyu | ................... | B62D 25/04 296/203.02 |
| 6,250,710 B1 * | 6/2001 | Matsuzaki | ........... | B62D 25/081 296/187.09 |

(Continued)

FOREIGN PATENT DOCUMENTS

JP     3617421 B2    2/2005
KR     1998-057773   9/1998
(Continued)

*Primary Examiner* — Gregory Blankenship
(74) *Attorney, Agent, or Firm* — Mintz Levin Cohn Ferris Glovsky and Popeo, P.C.; Peter F. Corless (57) ABSTRACT

A cowl side reinforcement structure of a vehicle includes a front pillar outer upper reinforcement member, a hood hinge mounting reinforcement member, and a cowl side reinforcement member. The front pillar outer upper reinforcement member forms a box-shaped cross-section with a cowl side, and forms a welding gun passing hole. The hood hinge mounting reinforcement member partially overlaps the front pillar outer upper reinforcement member. The cowl side reinforcement member is fixed to the hood hinge mounting reinforcement member, and includes a box-shaped body forming an internal space connected with the welding gun passing hole.

9 Claims, 8 Drawing Sheets

(56) References Cited

U.S. PATENT DOCUMENTS

| | | | | |
|---|---|---|---|---|
| 6,332,642 | B1* | 12/2001 | Hanyu | B62D 25/082 296/198 |
| 7,147,275 | B2* | 12/2006 | Matsuyama | B62D 25/088 296/187.09 |
| 2005/0046237 | A1* | 3/2005 | Miyoshi | B62D 25/082 296/203.02 |
| 2008/0036243 | A1* | 2/2008 | Kanagawa | B62D 25/082 296/192 |
| 2009/0146455 | A1* | 6/2009 | Honji | B62D 21/152 296/187.09 |
| 2014/0367994 | A1* | 12/2014 | Sasaki | B62D 25/08 296/187.09 |
| 2014/0375084 | A1* | 12/2014 | Le Roy | B62D 25/081 296/192 |
| 2015/0291223 | A1* | 10/2015 | Shin | B62D 27/023 296/192 |
| 2016/0194033 | A1* | 7/2016 | Kondo | B62D 25/04 296/192 |

FOREIGN PATENT DOCUMENTS

| | | |
|---|---|---|
| KR | 10-2008-0052754 A | 6/2008 |
| KR | 10-2011-0059351 | 6/2011 |
| KR | 10-2012-0053426 A | 5/2012 |
| KR | 10-2012-0126906 A | 11/2012 |

* cited by examiner

COWL SIDE REINFORCEMENT STRUCTURE IN VEHICLE

CROSS-REFERENCE TO RELATED APPLICATION

This application claims under 35 U.S.C. §119(a) the benefit of Korean Patent Application No. 10-2015-0171749 filed in the Korean Intellectual Property Office on Dec. 3, 2015, the entire contents of which are incorporated herein by reference.

BACKGROUND (a) Field of the Invention

The present invention relates to a cowl side reinforcement structure of a vehicle, more particularly, to a cowl side reinforcement structure in which the number of reinforcement members is minimized, and a weight of the reinforcement structure is reduced.

(b) Description of the Related Art

A cowl complete of a vehicle suppresses vibration from driving, specifically, distortion of the vehicle from an abrupt sharp turn, absorbs impact energy from collision of the vehicle, and prevents various parts in an engine room from entering into a passenger compartment of the vehicle due to the impact energy.

In addition, a cowl side of the vehicle is disposed between a fender apron upper member of a floor complete and a front side end of a side outer body, and is integrally coupled therewith by welding. Since a portion where the cowl side is disposed has relatively low stiffness, a reinforcement member is provided in an inner side of the cowl side.

The reinforcement member of the cowl side desirably should reduce production cost and the weight of the vehicle by minimizing the number of reinforcements, and should transfer impact applied to the vehicle when a front offset collision occurs to a front pillar of the side complete and disperse the impact.

In addition, in a conventional case, a structural adhesive may be used if the reinforcement is disposed in a portion where welding is impracticable. In this case, cycle time is extended, and therefore no portion where welding is impracticable should exist in aligning the reinforcements.

The above information disclosed in this Background section is only for enhancement of understanding of the background of the invention and therefore it may contain information that does not form the prior art that is already known in this country to a person of ordinary skill in the art.

SUMMARY

The present invention provides a cowl side reinforcement member that can reduce manufacturing cost and weight of a vehicle by minimizing the number of reinforcement members, increase transmission and dispersion of impact energy applied from a front offset collision of the vehicle, and eliminate the use of a structural adhesive by eliminating a portion where welding is impracticable.

A cowl side reinforcement structure of a vehicle according to an exemplary embodiment of the present invention is provided between a position where a side complete, a floor complete, and a cowl complete contact each other in a cowl side, and the cowl side reinforcement structure includes a front pillar outer upper reinforcement member, a hood hinge mounting reinforcement member, and a cowl side reinforcement member. The front pillar outer upper reinforcement member is fixed to a front side end of a side outer body and the fender apron upper member, forms a box-shaped cross-section with a cowl side, and forms a welding gun passing hole. The hood hinge mounting reinforcement member partially overlaps the front pillar outer upper reinforcement member and is fixed to the front pillar outer upper reinforcement member, the fender apron upper member, and a cowl inner lower panel. The cowl side reinforcement member is fixed to the hood hinge mounting reinforcement member, the cowl inner lower panel, and the fender apron upper member in the hood hinge mounting reinforcement member, and includes a box-shaped body forming an internal space connected with the welding gun passing hole.

The front pillar outer upper reinforcement member may include: a first side surface portion facing the cowl side and forming the welding gun passing hole; a first upper surface portion, a bottom surface portion, and a rear surface portion respectively bent from an upper side, a bottom side, and a rear side of the first side surface portion; and an upper flange and a lower flange respectively bent from the first upper surface portion and the bottom surface portion and thus fixed to the cowl side.

The rear surface portion may be fixed to a front side end of the side outer body, and the first upper surface portion, the first side surface portion, and a front side end of the bottom surface portion may be fixed to the fender apron upper member.

The hood hinge mounting reinforcement member may include: a second side surface portion partially overlapping the first side surface portion so as not to cover the welding gun passing hole; a second upper surface portion bent from an upper side of the second side surface portion and thus partially overlapping the first upper surface portion; and a rear flange bent from a rear side of the second upper surface portion.

One part of the second upper surface portion may be fixed to the first upper surface portion, another part of the second upper surface portion may be fixed to the fender apron upper member, and the rear flange may be fixed to a vertical portion of the cowl inner lower panel.

An upper side end of the cowl side, the upper flange and the first upper surface portion of the front pillar outer upper reinforcement member, and the second upper surface portion of the hood hinge mounting reinforcement member may be inclined with respect to the ground so as to connect the fender apron upper member and the front pillar.

The box-shaped body of the cowl side reinforcement member may include: a third side surface portion facing the welding gun passing hole and separated from the first side surface portion; a third upper surface portion bent from an upper side of the third side surface portion; and a front surface portion bent from a front side of the third side surface portion, and edges of the box-shaped body may be closely attached to the vehicle to close and seal the internal space.

The cowl side reinforcement member may further include: a first flange connected to an edge of the third side surface portion and a rear side edge of the third upper surface portion and fixed to the cowl inner lower panel; a second flange connected to an outer edge of the third upper surface portion and fixed to the hood hinge mounting reinforcement member; and a third flange connected to an edge of the front surface portion and a front side edge of the third side surface portion and fixed to the fender apron upper member and a part of a shock absorber housing.

In assembling the vehicle before assembly of the cowl side, a welding gun may enter into the box-shaped body through the welding gun passing hole and thus the floor complete and the cowl complete may be welded in the internal space of the box-shaped body.

According to the present exemplary embodiment, the number of reinforcement members is reduced thereby reducing manufacturing cost and the weight of the vehicle, the cowl side and the cowl side reinforcement structure function as an effective load path between the fender apron upper member and the front pillar such that impact applied to the fender apron upper member from a front offset collision can be properly transferred and dispersed to the outer body side.

The box-shaped cowl side reinforcement member can effectively suppress horizontal distortion and noise due to resonance of the vehicle, and noise, vibration, and harshness (NVH) performance of the vehicle can be improved. Further, the cowl side reinforcement member can serve as an impact absorber since it has excellent strength. Since the welding gun can enter into the cowl side reinforcement structure through the welding gun passing hole, use of a structural adhesive can be eliminated.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
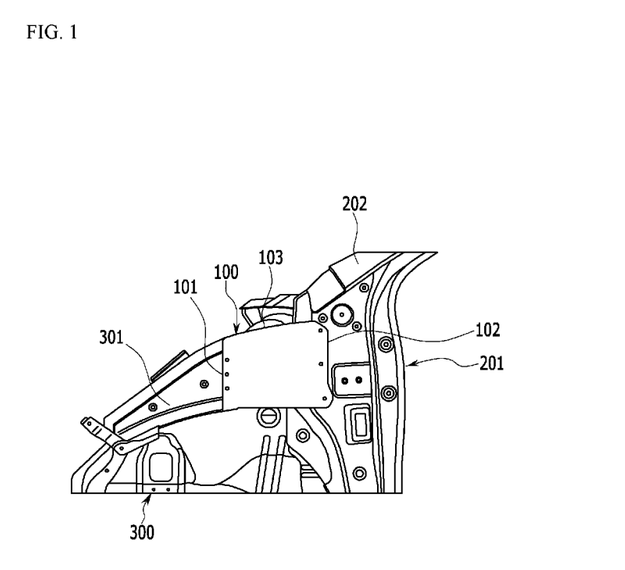
FIG. 1 is a partial side view of a cowl side and a periphery of the cowl side in a vehicle.

FIG. 1 is a partial side view of a cowl side and a periphery of the cowl side in a vehicle.

Referring to FIG. 1, a cowl side 100 is formed of a substantially flat plate, and is disposed between a side outer body 201 of a side complete and a fender apron upper member 301 of a floor complete 300.

Specifically, a front side end 101 of the cowl side 100 is disposed in contact with the fender apron upper member 301 and thus fixed to the fender apron upper member 301 by welding, and a rear side end 102 of the cowl side 100 is disposed in contact with a front side end of the side outer body 201, which is connected with an outer surface of a front pillar 202 and thus fixed to the outer surface of the front pillar 202 by welding.

The cowl side 100 connects the fender apron upper member 301 and the side outer body 201 so as to connect the fender apron upper member 301 and the front pillar 202 without allowing any disconnection of these components. In this case, an upper side end 103 of the cowl side 100 may be inclined at an angle of about 8 degrees with respect to the ground.

An end of the cowl complete preferably is integrally assembled into the floor complete 300 as shown in FIG. 1. In addition, a cowl side reinforcement structure is provided where the cowl complete, the side complete, and the floor complete 300 contact each other in the cowl side 100.

The above-described cowl side 100 and the cowl side reinforcement structure to be described hereinafter preferably are applicable to a light-weight vehicle, as distinguished from heavier vehicles such as trucks.

Figure 2:
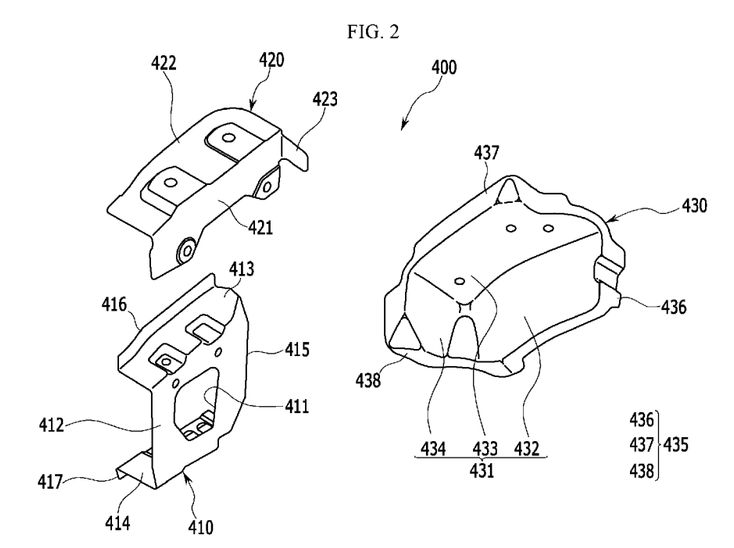
FIG. 2 is an exploded perspective view of a cowl side reinforcement structure according to an exemplary embodiment of the present invention.
Figure 3:
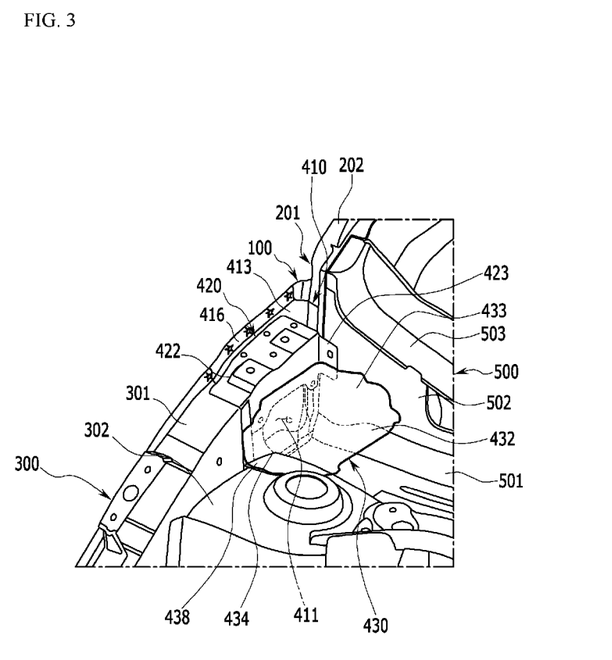
FIGS. 3 and 4 are perspective view illustrating a coupling state of the cowl side reinforcement structure according to the exemplary embodiment of the present invention.
Figure 4:
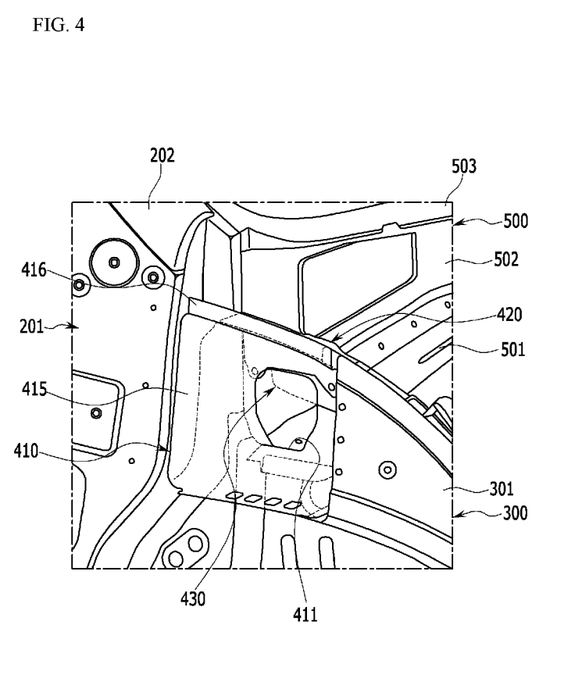

FIG. 2 is an exploded perspective view of a cowl side reinforcement structure according to an exemplary embodiment of the present invention, and FIGS. 3 and 4 are perspective views illustrating a coupling state of the cowl side reinforcement structure according to the exemplary embodiment of the present invention. In particular, FIG. 3 is a view from inside the vehicle, and FIG. 4 is a view from outside the vehicle.

Referring to FIGS. 2 to 4, a cowl side reinforcement structure 400 is formed of a front pillar outer upper reinforcement member 410, a hood hinge mounting reinforcement member 420, and a cowl side reinforcement member 430.

The front pillar outer upper reinforcement member 410 forms a box-shaped cross-section together with the cowl side 100. The hood hinge mounting reinforcement member 420 is coupled to an upper outer side of the front pillar outer upper reinforcement member 410. The cowl side reinforcement member 430 is substantially formed in the shape of a box, and is coupled to an inner side of the hood hinge mounting reinforcement member 420.

The front pillar outer upper reinforcement member 410 includes a first side surface portion 412 forming a welding gun passing hole 411 while facing the cowl side 100, a first upper surface portion 413, a bottom surface portion 414, and a rear surface portion 415 respectively bent substantially perpendicular from an upper side, a lower side, and a rear side (i.e., a side that faces toward the side outer body) of the first side surface portion 412, and upper and lower flanges 416 and 417 bent substantially perpendicular from the first upper surface portion 413 and the bottom surface portion 414.

The upper and lower flanges 416 and 417 are respectively disposed contacting upper and lower ends of the inside of the cowl side 100 and thus are fixed to the upper and lower ends of the inside of the cowl side 100, respectively, by welding. The upper flange 416 is formed in parallel with the upper end of the cowl side 100, and may be inclined at an angle of about 8 degrees from the ground.

The rear surface portion 415 is disposed contacting a front side end of the side outer body 201 and thus is fixed to the front side end of the side outer body 201, and the first upper surface portion 413, the first side surface portion 412, and a front side end of the bottom surface portion 414 are fixed to the fender apron upper member 301 of the floor complete 300.

Since the front pillar outer upper reinforcement member 410 includes the first upper surface portion 413 and the bottom surface portion 414 that are substantially perpendicular to the cowl side 100 and the first side surface portion 412 that is substantially parallel with the cowl side 100 (i.e., since the front pillar outer upper reinforcement member 410 has a "⊏" shaped cross-section, the front pillar outer upper reinforcement member 410 forms a box-shaped cross-section together with the cowl side 100). In addition, the front pillar outer upper reinforcement member 410 integrally connects the front pillar 202 and the fender apron upper member 310 without allowing disconnection in the cowl side 100.

Meanwhile, at least one drain hole may be formed in the bottom surface portion 414 of the front pillar outer upper reinforcement member 410.

The hood hinge mounting reinforcement member 420 includes a second side surface portion 421 partially overlapping the first side surface portion 412, a second upper surface portion 422 bent substantially perpendicular from an upper side of the second side surface portion 421 and partially overlapping the first upper surface portion 413, and a rear flange 423 bent substantially perpendicular from a rear side of the second side surface portion 421.

The second side surface portion 421 overlaps an upper side portion of the first side surface portion 412 so as not to cover the welding gun passing hole 411 of the first side surface portion 412. A part of the second upper surface portion 422 contacts the first upper surface portion 413 and thus is fixed to the first upper surface portion 413 by welding, and another part (i.e., a part of a front side) of the second upper surface portion 422 contacts the fender apron upper member 301 and thus is fixed to the fender apron upper member 301 by welding. The rear flange 423 contacts a vertical portion 502 of a cowl inner lower panel 501 of a cowl complete 500 and is fixed to the vertical portion 502 of the cowl inner lower panel 501 by welding.

The cowl complete 500 is disposed along a width direction of the vehicle, and lateral ends of the cowl complete 500 are coupled to the floor complete 300. The cowl complete 500 may be formed of the cowl inner lower panel 501 and a cowl top panel 503.

The hood hinge mounting reinforcement member 420 overlaps an inner upper portion of the front pillar outer upper reinforcement member 410, and integrally connects the cowl inner lower panel 501 and the fender apron upper member 301 in the cowl side 100.

The cowl side reinforcement member 430 is disposed in the hood hinge mounting reinforcement member 420 and includes a box-shaped body 431 forming an internal space that is connected with the welding gun passing hole 411 and a plurality of flanges 435 bent substantially perpendicular from an edge of the box-shaped body 431.

The box-shaped body 431 includes a third side surface portion 432 separated from the first side surface portion 412 while facing the welding gun passing hole 411, a third upper surface portion 433 bent substantially perpendicular from an upper side of the third side surface portion 432, and a front surface portion 434 bent perpendicular from a front side of the third side surface portion 432. The third side surface portion 432, the third upper surface portion 433, and front surface portion 434 are integrally connected, and cover the welding gun passing hole 411 to prevent the welding gun passing hole 411 from being exposed when being viewed in the vehicle.

The plurality of flanges 435 includes a first flange 436 contacting the cowl inner lower panel 501 and thus fixed to the cowl inner lower panel 501 by welding, a second flange 437 contacting the hood hinge mounting reinforcement member 420 and thus fixed to the hood hinge mounting reinforcement member 420 by welding, and a third flange 438 contacting the fender apron upper member 310 and a part of a shock absorber housing 302 of the floor complete 300 and thus fixed to the fender apron upper member 310 and the part of the shock absorber housing 302 by welding.

The first flange 436 is connected to an edge of the third side surface portion 432 and a rear side edge of the third upper surface portion 433. The second flange 437 is connected with an outer edge of the third upper surface portion 433. The third flange 438 is connected with an edge of the front surface portion 434 and a part of a front side edge of the third side surface portion 432.

The cowl side reinforcement member 430 integrally connects the cowl inner lower panel 501, the hood hinge mounting reinforcement member 420, and the floor complete 300 in the hood hinge mounting reinforcement member 420. That is, the cowl side reinforcement member 430 having the box-shaped body 431 is disposed at a position where the cowl inner lower panel 501 and the floor complete 300 contact each other.

The third side surface portion 432 reinforces rigidity of the first side surface portion 412 where the welding gun passing hole 411 is formed. During assembly of the vehicle body, the welding gun enters into the box-shaped body 431 through the welding gun passing hole 411 and thus the floor complete 300 and the cowl complete 500 are welded in the internal space of the box-shaped body 431.

Next, an assembly sequence of the above-described members will be described.

Figure 5:
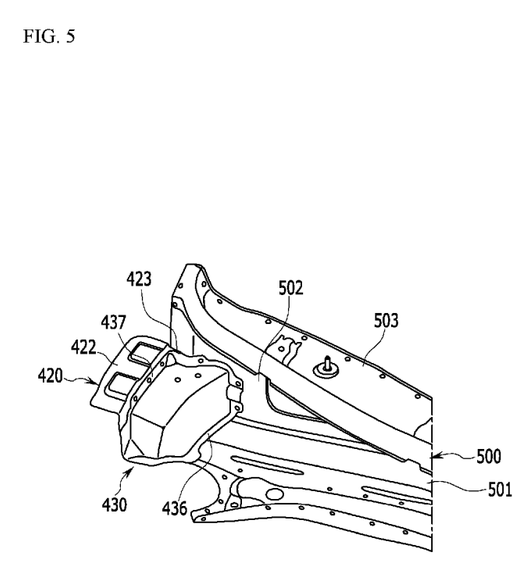
FIG. 5 is a perspective view of a hood hinge mounting reinforcement member, the cowl side reinforcement member, and a cowl complete of FIG. 3.
Figure 6:
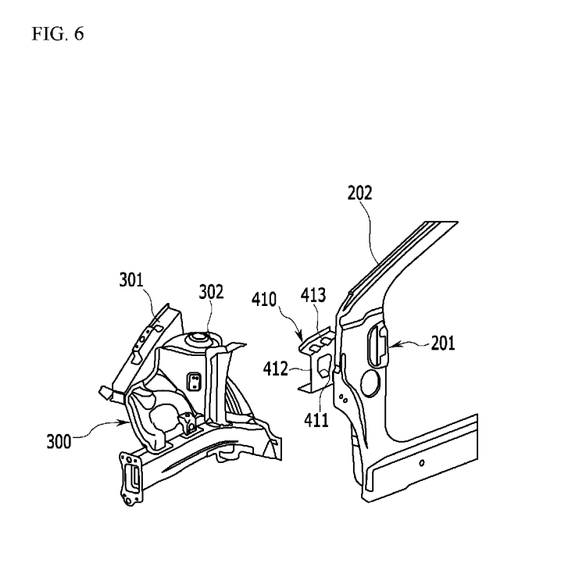
FIG. 6 is a perspective view of a front pillar outer upper reinforcement member, a side complete, and a floor complete of FIG. 3.

FIG. 5 is a perspective view of hood hinge mounting reinforcement member, the cowl side reinforcement, and the cowl complete of FIG. 3, and FIG. 6 is a perspective view of the front pillar outer upper reinforcement, the side complete, and the floor complete of FIG. 3.

Referring to FIG. 5, during assembly of the cowl complete 500, the rear flange 423 of the hood hinge mounting reinforcement member 420 is fixed to a vertical portion 502 of the cowl inner lower panel 501. In addition, the first flange 436 of the cowl side reinforcement member 430 is fixed to the cowl inner lower panel 501 and the vertical portion 502, and the second flange 437 of the cowl side reinforcement member 430 is fixed to the hood hinge mounting reinforcement member 420.

Referring to FIG. 6, the rear surface portion 415 (see FIG. 4) of the front pillar outer upper reinforcement member 410 is fixed to a front side end of the side outer body 201. In addition, during assembly of the side outer body 201 and the floor complete 300, a front side end of the front pillar outer upper reinforcement member 410 is fixed to the fender apron upper member 301 by welding.

Referring back to FIG. 3, an end of the cowl complete 500 is assembled to the floor complete 300. In such a process, the second upper surface portion 422 of the hood hinge mounting reinforcement member 420 is fixed to the first upper surface portion 413 and the fender apron upper member 301, and the second side surface portion 421 is fixed to the first side surface portion 412. In addition, the third flange 438 of the cowl side reinforcement member 430 partially contacts the fender apron upper member 301 and the shock absorber housing 302 and thus is fixed to the fender apron upper member 301 and the shock absorber housing 302.

Figure 7:
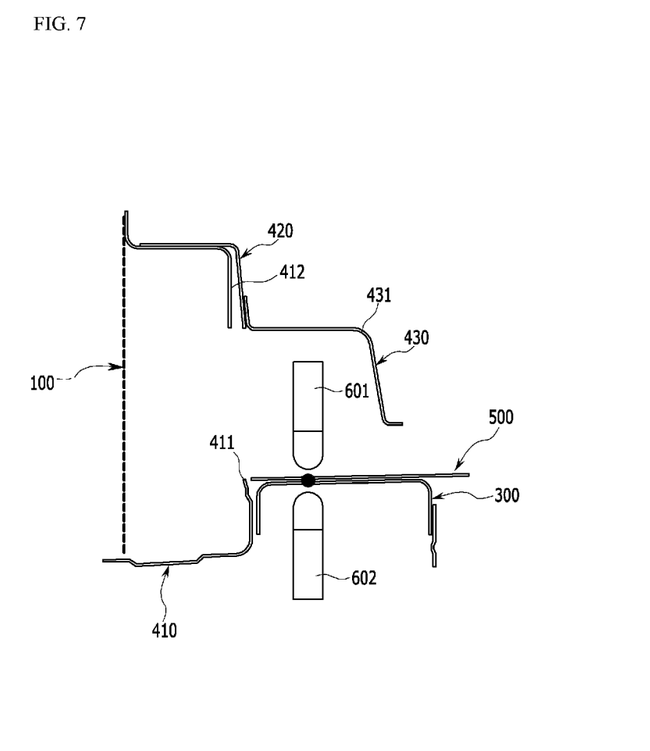
FIG. 7 is a cross-sectional view of the cowl side reinforcement structure of FIG. 3.

FIG. 7 is a cross-sectional view of the cowl side reinforcement structure of FIG. 3.

Referring to FIG. 7, during assembly of the cowl complete 500 and the floor complete 300, a first welding gun 601 enters into the box-shaped body 431 of the cowl side reinforcement member 430 through the welding gun passing hole 411 formed in the front pillar outer upper reinforcement member 410. A second welding gun 602 enters from a bottom side of the floor complete 300.

The cowl complete 500 and the floor complete 300 are welded in the box-shaped body 431 of the cowl side reinforcement member 430 by the first welding gun 601 and the second welding gun 602.

Referring to FIGS. 1 and 7, the front side end 101 of the cowl side 100 is fixed to the fender apron upper member 301, and the rear side end 102 of the cowl side 100 is fixed to a front side end of the side outer body 201. In addition, an upper side end and a bottom side end of the cowl side 100 are fixed to the upper and lower flanges 416 and 417 of the front pillar outer upper reinforcement member 410, respectively.

The above-configured cowl side reinforcement member 40 is suitable for use in a light-weight vehicle (as compared to heavier vehicles such as trucks), and the number of parts can be reduced by mounting the hood hinge mounting reinforcement member 420 above the front pillar outer upper reinforcement member 410. For example, compared to a conventional reinforcement structure formed of five reinforcement materials, the number of reinforcement members can be reduced to three such that manufacturing cost and the weight of the vehicle can be reduced.

Further, the front pillar outer upper reinforcement member 410 and the cowl side 100 form the box-shaped cross-section such that the front pillar 202 and the fender apron upper member 301 can be integrally connected without the possibility of disconnection. Thus, when a front offset collision of the vehicle occurs, impact applied to the fender apron upper member 301 can be transferred and thus dispersed to the side outer body 201.

Figure 8:
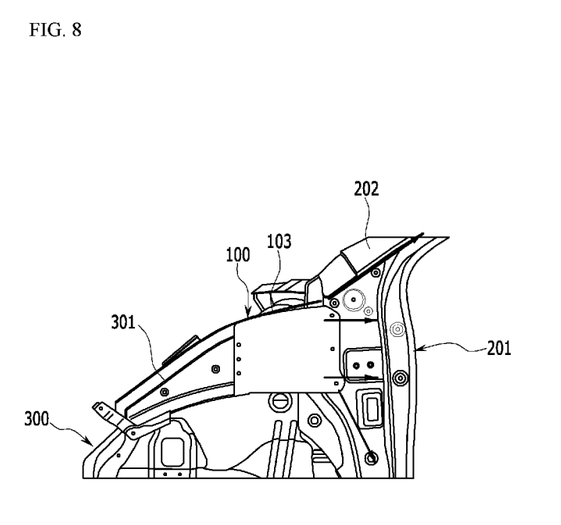
FIG. 8 is a schematic diagram of a transmission route of impact energy when a front offset collision occurs in FIG. 1.

FIG. 8 is a schematic diagram of a transmission route of impact energy when a front offset collision of the vehicle occurs in FIG. 1.

Referring to FIG. 8, when a front offset collision occurs, impact applied to the fender apron upper member 301 is properly dispersed to the cowl side 100 and an upper side (on the front pillar 202 side), a middle side, and a bottom side of the side outer body 201 through the cowl side reinforcement structure 40.

In this case, as shown in FIG. 3, since the fender apron upper member 301 and the front pillar 202 have a height difference, the upper side end 103, the first upper surface portion 413, and the second upper surface portion 422 of the cowl side 100 are inclined about 8 degrees with respect to the ground. Thus, the cowl side 100 and the cowl side reinforcement structure 40 may function as an effective load pass (load transmission route) between the fender apron upper member 301 and the front pillar 202.

In addition, the cowl side reinforcement member 430 provided with the box-shaped body 431 serves as a strong support that suppresses generation of noise and vibration. The cowl side reinforcement member 430 has a high section modulus due to the box-shaped body 431, and has excellent cross-section strength compared to a support having a shape other than the box. The cowl side reinforcement member 430 can effectively suppress horizontal distortion of the vehicle and noise due to resonance, and can greatly improve noise, vibration, and harshness (NVH) performance.

Further, the cowl side reinforcement member 430 directly connects the cowl complete 500 and the floor complete 300, and accordingly, when a front offset collision of the vehicle occurs, impact transmitted from the fender apron upper member 301 can be properly dispersed to the fender apron upper member 301. In addition, since the cowl side reinforcement member 430 has high strength, a certain amount of impact can be absorbed by the cowl side reinforcement member 430.

Further, the cowl side reinforcement member 430 can effectively close and seal the inside of the box-shaped body 431 by using the plurality of flanges 435 such that excellent sealing performance and water tightness can be assured.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cowl side reinforcement structure of a vehicle, provided between a position where a side complete, a floor complete, and a cowl complete contact each other in a cowl side, comprising:
   a front pillar outer upper reinforcement member fixed to the cowl side, a front side end of a side outer body, and a fender apron upper member, and forming a box-shaped cross-section with the cowl side and forming a welding gun passing hole;

a hood hinge mounting reinforcement member partially overlapping the front pillar outer upper reinforcement member and fixed to the front pillar outer upper reinforcement member, the fender apron upper member, and a cowl inner lower panel; and a cowl side reinforcement member fixed to the hood hinge mounting reinforcement member, the cowl inner lower panel, and the fender apron upper member in the hood hinge mounting reinforcement member, and including a box-shaped body forming an internal space connected with the welding gun passing hole.

2. The cowl side reinforcement structure of claim 1, wherein the front pillar outer upper reinforcement member comprises:

a first side surface portion facing the cowl side and forming the welding gun passing hole;

a first upper surface portion, a bottom surface portion, and a rear surface portion respectively bent from an upper side, a bottom side, and a rear side of the first side surface portion; and an upper flange and a lower flange respectively bent from the first upper surface portion and the bottom surface portion and thus fixed to the cowl side.

3. The cowl side reinforcement structure of claim 2, wherein the rear surface portion is fixed to a front side end of the side outer body, and the first upper surface portion, the first side surface portion, and a front side end of the bottom surface portion are fixed to the fender apron upper member.

4. The cowl side reinforcement structure of claim 2, wherein the hood hinge mounting reinforcement member comprises:

a second side surface portion partially overlapping the first side surface portion so as not to cover the welding gun passing hole;

a second upper surface portion bent from an upper side of the second side surface portion and thus partially overlapping the first upper surface portion; and a rear flange bent from a rear side of the second side surface portion.

5. The cowl side reinforcement structure of claim 4, wherein one part of the second upper surface portion is fixed to the first upper surface portion, another part of the second upper surface portion is fixed to the fender apron upper member, and the rear flange is fixed to a vertical portion of the cowl inner lower panel.

6. The cowl side reinforcement structure of claim 4, wherein an upper side end of the cowl side, the upper flange and the first upper surface portion of the front pillar outer upper reinforcement member, and the second upper surface portion of the hood hinge mounting reinforcement member are inclined with respect to the ground and thus connect the fender apron upper member and the front pillar.

7. The cowl side reinforcement structure of claim 4, wherein the box-shaped body of the cowl side reinforcement member comprises:

a third side surface portion facing the welding gun passing hole and separated from the first side surface portion;

a third upper surface portion bent from an upper side of the third side surface portion; and a front surface portion bent from a front side of the third side surface portion, and edges of the box-shaped body are closely attached to the vehicle to close and seal the internal space.

8. The cowl side reinforcement structure of claim 7, wherein the cowl side reinforcement member further comprises:

a first flange connected to an edge of the third side surface portion and a rear side edge of the third upper surface portion and fixed to the cowl inner lower panel;

a second flange connected to an outer edge of the third upper surface portion and fixed to the hood hinge mounting reinforcement member; and a third flange connected to an edge of the front surface portion and a front side edge of the third side surface portion and fixed to the fender apron upper member and a part of a shock absorber housing.

9. The cowl side reinforcement structure of claim 7, wherein during assembly of the vehicle before assembly of the cowl side, a welding gun is configured to enter into the box-shaped body through the welding gun passing hole such that the floor complete and the cowl complete are welded in the internal space of the box-shaped body.

* * * * *